US008244255B1

(12) United States Patent
Oroskar et al.

(10) Patent No.: US 8,244,255 B1
(45) Date of Patent: Aug. 14, 2012

(54) PILOT STRENGTH MEASUREMENT MESSAGE (PSMM)-BASED HANDOFF FOR MOBILE DEVICES

(75) Inventors: Siddharth Oroskar, Overland Park, KS (US); Sachin Vargantwar, Overland Park, KS (US); Debasish Sarkar, Irvine, CA (US); Rajveen Narendran, Overland Park, KS (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 965 days.

(21) Appl. No.: 12/257,004

(22) Filed: Oct. 23, 2008

(51) Int. Cl.
*H04W 36/00* (2009.01)

(52) U.S. Cl. ........ 455/439; 455/436; 455/437; 455/438; 455/440; 455/441; 455/442; 455/443; 455/444; 370/331; 370/332

(58) Field of Classification Search .......... 455/436–444; 370/331–332
See application file for complete search history.

(56) References Cited

U.S. PATENT DOCUMENTS

| | | | | |
|---|---|---|---|---|
| 6,119,005 | A * | 9/2000 | Smolik | 455/436 |
| 6,351,642 | B1 * | 2/2002 | Corbett et al. | 455/442 |
| 6,438,376 | B1 * | 8/2002 | Elliott et al. | 455/437 |
| 6,546,248 | B1 | 4/2003 | Jou | |
| 7,474,895 | B1 * | 1/2009 | Jiang et al. | 455/436 |
| 7,953,411 | B1 * | 5/2011 | Chion | 455/436 |
| 2004/0097234 | A1 * | 5/2004 | Rajkotia et al. | 455/442 |
| 2006/0166671 | A1 * | 7/2006 | Rajkotia et al. | 455/436 |
| 2007/0060126 | A1 * | 3/2007 | Taniguchi et al. | 455/436 |
| 2010/0069070 | A1 * | 3/2010 | Shi et al. | 455/436 |

OTHER PUBLICATIONS

Handoff, Sep. 27, 2008. http://en.wikipedia.org/wiki/Handoff.

* cited by examiner

*Primary Examiner* — Rafael Pérez-Gutiérrez
*Assistant Examiner* — Liton Miah

(57) ABSTRACT

Systems, methods, and computer-readable media for basing a handoff of a mobile device on its position within a coverage area of a source base transceiver station (BTS) are provided. Initially, embodiments involve recording threshold distances, associated with candidate BTSs neighboring the source BTS, and capturing pilot strength measurement messages (PSMM's) at each of the threshold distances. Upon establishing a connection to the source BTS, the position of the mobile device is monitored to detect a traversal of the threshold distances. Consequently, the mobile device reports a current PSMM for comparison against the captured PSMM's. If any messages correspond, a candidate BTS is selected for receiving the connection of the mobile device. Otherwise, the connection to the source BTS is maintained. Accordingly, the distance of the mobile device from the source BTS at which the handoff is invoked may vary based on a radial direction of the mobile device therefrom.

18 Claims, 7 Drawing Sheets

| 175 | 03/10/08 21:22:06.187 | 4 | FORWARD | ORDER MESSAGE | 0 | 0 |
| 176 | 03/10/08 21:22:07.018 | 4 | REVERSE | PILOT STRENGTH MEASUREMENT | 4 | 1 |

LINE ID: 176
MESSAGE ID: 176
TIME: 03/10/08 21:22:07.018
LATITUDE: 38.913038    LONGITUDE: -94.705249
CHANNEL: REVERSE
MESSAGE: PILOT STRENGTH MEASUREMENT MESSAGE~520
ACK_SEQ: 4
MSG_SEQ: 1
ACK_REQ: 1

ENCRYPTION: 0 <DISABLED>
REF_PN: 144
 PILOT STRENGTH: -7.5
 KEEP: 1
PILOT1_PN_PHASE: 236227 <PILOT PN OFFSET 369, PHASE DELAY 11>
 PILOT1_STRENGTH: -17.0
 KEEP: 1
PILOT2_PN_PHASE: 23425 <PILOT PN OFFSET 366, PHASE DELAY 1>
 PILOT2_STRENGTH: -27.0
 KEEP: 1
PILOT3_PN_PHASE: 9024 <PILOT PN OFFSET 141, PHASE DELAY 0>
 PILOT3_STRENGTH: -9.5
 KEEP: 1
PILOT4_PN_PHASE: 3305 <PILOT PN OFFSET 51, PHASE DELAY -23>
 PILOT4_STRENGTH: -12.0
 KEEP: 1

*FIG. 5.*

| DISTANCE | PSMM MESSAGE | PSMM SNAPSHOT TABLE EXEMPLARY ACTIONS |
|---|---|---|
| X | PSMM A | E.G.: KEEP PN 144, KEEP PN 202, UNKEEP PN 24 |
| Y | PSMM B | E.G.: KEEP PN 408, KEEP PN 200, UNKEEP PN 56 |
| Z | PSMM B | E.G.: KEEP PN 592, KEEP PN 624, UNKEEP PN 44 |

FIG. 6.

PILOT STRENGTH MEASUREMENT MESSAGE (PSMM)-BASED HANDOFF FOR MOBILE DEVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Within the wireless industry, service providers have employed a variety of tools to aid in determining the location of a mobile device being operated by the end user. Service providers often employ some of these tools to search for mobile devices that are communicating with a wireless network via base transceiver stations (BTSs) thereof. In one instance, a tool for estimating a distance of the mobile device from a BTS in communication with the mobile device by utilizing round-trip delay (RTD) measurements therebetween.

In use, the determination of the distance of the mobile device from a BTS facilitates a handoff of the mobile device from the current BTS in communication with the mobile device to another BTS within the wireless network. In one instance, the current BTS maintains a predetermined distance from the current BTS at which a handoff should be triggered. If it is detected the mobile device crosses that predetermined distance (e.g., utilizing the RTD measurement between the mobile device), the current BTS will handoff the mobile device to another BTS.

This method of tracking a distance of a mobile device and triggering a handoff based thereon is not able to accommodate a variety of BTSs in various distances and directions from the currently communicating BTS. Typically, the predetermined distance is set at a minimum calculated from all closest surrounding BTSs. By way of example, if a predetermined distance from the currently communicating mobile device is fixed at ten miles (e.g., based on a closest BTS in a particular direction), a handoff is triggered upon the mobile device traveling ten miles in any direction, irrespective of whether the closest BTS in another particular direction is over eighty miles away. As a result, in the instance that the mobile device is traveling away from the closest BTS, a handoff is triggered prematurely causing a weak signal, or even a disconnection between the mobile device and the wireless network. This creates end user dissatisfaction.

As such, employing a flexible technique for triggering a handoff between a currently communicating BTS and the mobile device that takes into account locations and signal strengths of the closest BTSs surrounding the current BTS, and basing a handoff in accordance with this information, would enhance an end user's experience when traveling within a wireless network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Some embodiments provide computer-readable media for, among other things, invoking a handoff of a mobile device between a source BTS and a target BTS in a wireless network by maintaining a data store at a source BTS that holds information related to a plurality of candidate BTSs, and employing the data store to initiate a handoff with the target BTS, selected from the candidate BTSs, based on the information. Embodiments have several practical applications in the technical arts, including maintaining information that is particular to each of the candidate BTSs and comparing a measurement of position (e.g., distance and radial direction from the BTS) reported by the mobile device against this information. Accordingly, distance of the mobile device from the source BTS at which a handoff is invoked may vary based on a radial direction of the mobile device therefrom, and the distance, signal strength, etc., of a target BTS in that particular radial direction.

Embodiments generally relate to triggering a handoff of a mobile device based on a distance and radial direction of the mobile device in relation to a source BTS (e.g., BTS currently communicating with the mobile device) and a distance, radial direction, and other parameters, of the candidate BTSs (e.g., BTSs that are not in sustained communication with the mobile device, but neighbor the source BTS) in relation to the source BTS. More particularly, a first aspect of an embodiment includes one or more computer-readable media that have computer-useable instructions embodied thereon for performing a method of triggering a handoff between a plurality of BTSs of a wireless network. In instances, a connection between a mobile device and a source BTS may be established. The mobile device may transmit a first communication to the source BTS via the connection, where a pilot strength measurement message (PSMM) may be extracted, derived, inspected, or filtered from the first communication. Based upon the PSMM, a decision of whether to invoke a handoff of the mobile device from the source BTS to a target BTS is made. When it is ascertained that a handoff is to be invoked, the target BTS is triggered to initiate establishing a connection with the mobile device. When it is ascertained that the handoff is not to be invoked, the connection between the mobile device at the source BTS is maintained.

In a second aspect, embodiments are directed toward a computerized method for initiating a handoff from a source base transceiver station (BTS) to one of a plurality of candidate BTSs of a wireless network. Generally, the plurality of candidate BTSs are neighbors of the source BTS such that a coverage area of each of the plurality of candidate BTSs intersects with a coverage area of the source BTS. Initially, a connection between a mobile device and the source BTS is established that facilitates the conveyance of communications therebetween. Upon establishing the connection, a position of the mobile device is monitored utilizing characteristics of the mobile device extracted from the communications therefrom. In embodiments, the characteristics include a distance and radial direction of the mobile device in relation to the source BTS. At particular times, aspects of the characteristics are compared against a table of predefined criteria stored in association with the source BTS. A handoff of the mobile device from the source BTS to one of the plurality of candidate BTSs may be initiated based on an outcome of the comparison.

A further aspect of an embodiment takes the form of a computer system capable of initiating a handoff from a BTS to one of a plurality of candidate BTSs that support a wireless network. Initially, the computer system includes a mobile device that is configured to transmit communications via a wireless connection with the first BTS. The first BTS is adapted to monitor a position of the mobile device utilizing characteristics of the mobile device extracted from the communications. As mentioned above, the characteristics of the mobile device that may be present in one or more communications may include a distance and radial direction of the mobile device in relation to the source BTS. In other instances, the first BTS is adapted to compare aspects of the characteristics against a table of predefined criteria stored in association with the source BTS. The system may further include the plurality of candidate BTSs that are neighbors of the first BTS such that a coverage area of each of the plurality of candidate BTSs intersects with a coverage area of the source BTS. Under particular circumstances, a second BTS, which is a member of the plurality of candidate BTSs, may be selected for establishing a wireless connection with the mobile device, based on an outcome of the comparison. Upon selection, the second BTS is capable of initiating a handoff of the mobile device from the first BTS thereto.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 is an illustrative display showing an exemplary PSMM reported from a mobile device, in accordance with an embodiment of the present invention;

FIG. 6 is an illustrative table showing an exemplary criteria for initiating a handoff, in accordance with an embodiment of the present invention.

DETAILED DESCRIPTION

Figure 1:
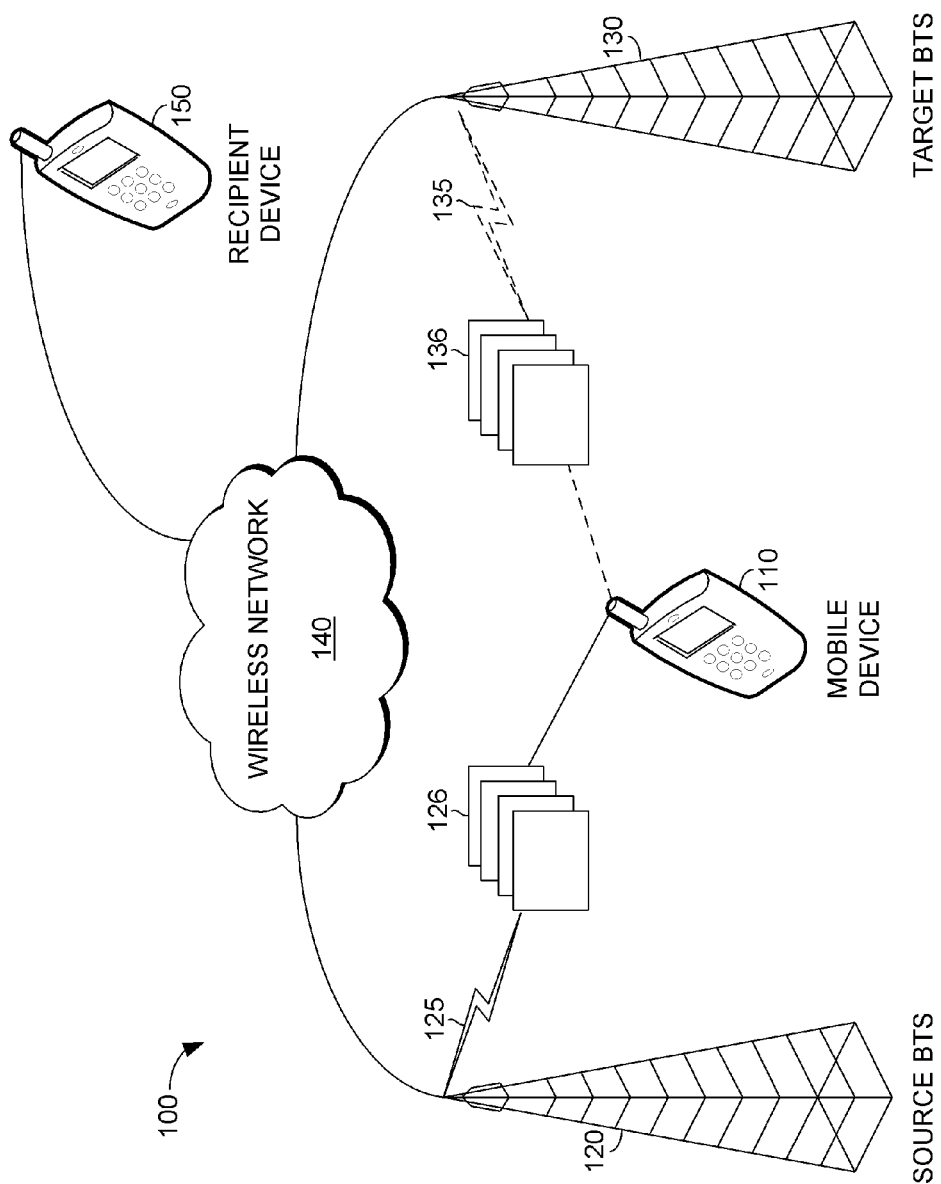
FIG. 1 is a block diagram of an exemplary system architecture suitable for use in implementing embodiments of the present invention.

Embodiments provide systems and methods for employing a flexible technique for triggering a handoff between a currently communicating BTS and a mobile device, where the technique takes into account locations and signal strengths of candidate BTSs, which may include the closest BTSs surrounding the current BTS. Basing a handoff in accordance with this information is useful to enhance an end user's experience when traveling within a wireless network. That is, by simply monitoring the distance and radial direction of a position of a mobile device in proximity to the currently communicating BTS, and using these characteristics of the mobile to satisfy handoff criteria (e.g., taking into account the information related to the candidate BTSs), handoff's may be invoked at various optimal distances to promote high-connection quality between the mobile device and a wireless network.

ACRONYMS AND SHORTHAND NOTATIONS

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| BTS | Base Transceiver Station |
| LANs | Local Area Networks |
| PDA | Personal Digital Assistant |
| PSMM | Pilot Strength Measurement Message |
| RTD | Round-trip Delay |
| WANs | Wide Area Networks |

Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Methods and systems are provided for triggering a handoff between a plurality of base transceiver stations (BTSs) of a wireless network. As used herein, the term "handoff" is not meant to be limiting, and may refer to any or all aspects of transferring an ongoing connection (e.g., call, data session, and the like) from one BTS in a wireless network to another. Generally, as discussed more fully below, a handoff is induced when a mobile device is moving away from, or out of, an area covered by a BTS in current communication with the mobile device, which is referred to herein as a "source BTS," and toward, or into, an area covered by a BTS that is a candidate for receiving a transfer of the connection, which is referred to herein as a "target BTS." Accordingly, in one instance, a handoff may occur when a phone call in progress is redirected from a source BTS to a target BTS.

As more fully discussed below, for a practical realization of handoffs in a wireless network, each BTS is assigned a list of potential candidate BTSs, which can be used for handing-off calls. These potential target BTSs are generally neighbors of a subject BTS, and may be identified in a table, or any other storage format, that is accessible to the subject BTS. Creating such a table for a given subject cell may be implemented using field measurements or computer predictions of radio wave propagation in the areas covered by the subject BTS. In one instance, the field measurements may include threshold distances at which a handoff to one or more candidate BTSs should optimally occur, and PSMM's recorded at the threshold distances to indicate a position of the mobile device, thereby supporting the decision of which candidate BTS to select for handoff, and when to initiate the handoff. This information in the table may be compared against one or more characteristics of the mobile device, typically revealed during a connection to a source BTS.

The characteristics of the mobile device (e.g., position) or the connection (e.g., parameters of the connection signal in the channel utilized by the source BTS) may be revealed via monitoring communications over the connection to a source BTS. These characteristics may be assessed in order to decide when a handoff may be necessary. In embodiments, the handoff may be requested by the mobile device, by the BTS, by a target BTS of the candidate BTSs, or by another component of the wireless network environment.

Although various different criteria for initiating a handoff, and methods associated with collecting information to support the criteria, have been described, it should be understood and appreciated by those of ordinary skill in the art that other types of suitable criteria, upon satisfaction via one or more characteristics of the BTSs, the mobile device, or the communication therebetween, may be used, and that embodiments of the present invention are not limited to those specific examples of criteria described herein. For instance, parameters used as criteria for requesting a handoff may be signal power and or inference of a signal within a connection.

In instances, the handoff may comprise a hard handoff or a soft handoff. A hard handoff is one in which a channel of the source BTS is released prior to the channel of the target BTS being engaged. As such, the connection of the mobile device to the wireless network is briefly broken before a connection to the target BTS is made. This type of handoff is intended to be instantaneous and unnoticeable in order to minimize any end user perception of a disruption to a call or data session being carried out by the connection to the wireless network. In a specific example, a hard handoff is implemented by changing a channel upon which the connection is made. Changing the channel may be realized by changing a pair of used transmit and receive frequencies. Further, hard handoff procedures may instruct the wireless network to reestablish the connection with the source BTS upon determining that a connection with the target BTS cannot be made. Reestablishing the connection may occur with no more than a temporary disruption of the connection.

Alternatively, a soft handoff is one in which a channel of the source BTS is retained and used in parallel with a channel established at the target BTS. That is, the connection to the target BTS is made prior to the connection to the source BTS is torn down, or broken. Accordingly, a connection may be in a state of soft handoff, where a mobile device is connected via two or more BTSs at two or more channels of the wireless network, thereby building in reliability to the connection and reducing the probability of a termination thereof. As such, to accomplish a soft handoff, the hardware of the mobile device should be capable of receiving two or more channels in parallel.

Referring to the drawings in general, and initially to FIG. 1 in particular, a block diagram of an exemplary operating environment is shown and designated generally as system 100 configured to provide a user access to a secured portion of a website by authenticating a mobile device. It should be understood that this and other arrangements described herein are set forth only as examples. Other arrangements and elements (e.g., machines, interfaces, functions, orders, and groupings of functions, etc.) can be used in addition to, or instead of, those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory, as discussed above.

With continued reference to FIG. 1, an exemplary system architecture is illustrated that shows the exemplary system 100 configured to initiate a handoff from a first BTS (i.e., source BTS) to a second BTS (i.e., target BTS) of a plurality of candidate BTSs that are interconnected via a wireless network 140. Initially, the system 100 includes a mobile device 110, a source BTS 120, a target BTS 130, the wireless network 140, and the recipient device 150. The mobile device 110 is configured to transmit communications 126 via a wireless connection 125 with the source BTS 120. Further the mobile device 110 is configured to move, within the system 100, in and out of coverage areas generated by the source BTS 120 and the target BTS 130, respectively. Generally, the mobile device 110 may be any type of device having communications capability. For instance, the mobile device 110 may be, or variously referred to as, a handheld device, mobile handset, consumer electronics device, cell phone, personal digital assistant (PDA) unit, and the like.

In addition, each mobile device 110 is provisioned with hardware that facilitates transmission and receptions of signals over the wireless connection 125. These signals may include communications 126 (e.g., round-trip delay (RTD) measurements, PSMM, and the like) that are consistent with a call, data session, etc. The communications 126 may be transmitted at the commencement or ending of establishing a connection, or at any time(s) therebetween.

In one embodiment, the hardware of the mobile device 110 is capable of establishing the connection 125 to the source BTS 120 that carries a first communication, included in the communications 126, on a channel of the wireless network 140 supported by the source BTS 120. Upon initiating a handoff, the connection 125 between the mobile device 110 and the source BTS 120 may be torn down, or broken. Immediately thereafter, a connection 135 may be established with the target BTS 130 that is capable of carrying messages 136, similar to the messages 126, to the wireless network 140. Accordingly, a second communication, included in the communications 136, may be transmitted to, or received from, the target BTS 130. In instances, a channel of a wireless network 140 may be assigned to the connection 135 for carrying the second communication.

In embodiments, the source BTS 120 is configured for monitoring a position of the mobile device 110 utilizing characteristics of the mobile device extracted from the communications 126. As discussed more fully below, these characteristics may include at least one of a distance or a radial direction of the mobile device 110 with respect to the source BTS 120. In additional embodiments, the source BTS 120 is configured for monitoring a position of the mobile device 110 utilizing characteristics of the mobile device 110 that are read from the communications 126.

The process of reading the characteristics from the communications 126 may be carried out by logic embodied on computer-readable media, discussed supra, accommodated on hardware and executable at the source BTS 120. The hardware may take the form of various types of computing devices, such as, for example only and not limitation, a personal computer, desktop computer, laptop computer, consumer electronic device, handheld device (e.g., personal digital assistant), various servers, and the like. It should be noted, however, that the invention is not limited to implementation on such computing devices, but may be implemented on any of a variety of different types of computing devices, or stand-alone hardware within the scope of embodiments of the present invention.

In embodiments, the process of reading the characteristics may comprise one or more of the following procedures: receiving a PSMM reported from the mobile device 110, inspecting an RTD measurement of the mobile device 110, detecting global positioning system (GPS) coordinates of the mobile device 110, or retrieving information related to the position of the mobile device 110 with respect to the source BTS 120.

Further, in other embodiment, the source BTS 120 is configured for comparing aspects of the characteristics against a table of predefined criteria. Comparing may comprise matching one or more of the characteristics of the mobile device 110 against at least one segment of the table. In one instance, the characteristic of a distance of the mobile device 110 from the source BTS 120 (e.g., determined utilizing the RTD measurement) may be compared against at least one of a plurality of threshold measurements recorded as criteria in the table. In another instance, the characteristic of a position of the mobile device 110 within the coverage area of the source BTS 120 (e.g., determined utilizing the reported PSMM) may be compared against at least one of a plurality of previously captured PSMM recorded as criteria in the table. The criteria may be recorded in other formats known to those of skill in the relevant field.

Further, the criteria may be stored in a data store that is accessible to the source BTS 120. The data store (not shown) is generally configured to store information associated with making a determination to handoff a connection of the mobile device 110, discussed below. In various embodiments, such information may include, without limitation, characteristics of the mobile device 110, features related to signal strengths of the BTSs of the system 100 (e.g., coverage area of the source BTS 120, coverage area of the target BTS 130, coverage area of other candidate BTSs, etc.), and/or locations of the BTSs of the system 100 with respect to the source BTS 120. In addition, the data store may be configured to be searchable for suitable access of stored information. For instance, the data store may be searchable for one or more segments of a table for comparison to information read in the message 126. Further, the data store may be accessible by, and/or maintained by, any one of the source BTS 120, the target BTS 130, another component linked to the wireless network, or one or more of the devices 110 or 150. It will be understood and appreciated by those of ordinary skill in the art that the information stored in the data store may be configurable and may include any information relevant to the comparison process. The content and volume of such information are not intended to limit the scope of embodiments of the present invention in any way. Further, though referred to as a single, independent component, the data store may, in fact, be a plurality of databases, for instance, a database cluster, portions of which may reside on hardware associated with the source device 120, the wireless network 140, another external computing device (not shown), and/or any combination thereof.

As described herein, the source BTS 120, the target BTS 130, and any other BTSs, such as the candidate BTSs, are utilized to connect to the mobile device 110 to facilitate communicating to the recipient device 150 over a wireless network 140. The BTSs 120 and 130 may be capable of transmitting a signal originating from a particular cell site. The BTSs 120 and 130 may further be capable of receiving a signal from the device 110 and 150 that has entered within their respective coverage areas, which area is based on the strength of their respective signals. In embodiments, each of the BTSs may comprise one or more sectors located at the cell site that facilitate a connection with the mobile device 110 over a particular angular portion of the coverage area of the BTSs. Accordingly, the sectors may handoff the connection 125 of the mobile device as it moves radially about one of the BTSs, thereby maintaining the connection 125 with the wireless network 140. In a particular embodiment, each sector comprises an antenna pointed in a particular direction radially away from the BTS. In other embodiments, each sector, or cell site, may include two or more antennas that are each directed to generate a portion of the coverage area.

In operation, when conducting a call or data session with the source BTS, the mobile device 110 may send signals or messages (e.g., the messages 126) that are received by the antennas. These signals are processed by the source BTS 120. This processing is described more fully above and can encompass the comparing process as well as a process of managing resource allocation of the system 110, assessing connectivity of other BTSs, and orchestrating handoffs based on results of some of the processes.

The target BTS 130 is configured to receive messages 136 from the mobile device 110 upon establishing a connection 135 therewith. The connection 135 may be established upon invoking a handoff from the source BTS 120 to the target BTS 130. In a particular embodiment, the target BTS 130 is configured for initiating the handoff of the mobile device 110 upon selection of the target BTS 130. In embodiments, the target BTS 130 is selected from a manifest of candidate BTSs maintained at the source BTS 120. Generally, the plurality of candidate BTSs that are neighbors of the source BTS 120 such that a coverage area of each of the plurality of candidate BTSs, including the target BTS 130, intersects with a coverage area of the source BTS 120. In an exemplary embodiment, target BTS 130 is selected for establishing the wireless connection 135 with the mobile device 110 based on an outcome of the comparison process.

This exemplary system architecture is but one example of a suitable environment that may be implemented to carry out aspects of the present invention, and is not intended to suggest any limitation as to the scope of use or functionality of the invention. Neither should the illustrated exemplary system architecture be interpreted as having any dependency nor requirement relating to any one or combination of the components 110, 120, 130, and 150 as illustrated. In some embodiments, one or more of the components 110, 120, 130, and 150 may be implemented as stand-alone devices. In other embodiments, one or more of the components (e.g., the recipient device 150) may be integrated directly into the wireless network 140. It will be understood by those of ordinary skill in the art that the components 110, 120, 130, and 150 illustrated in FIG. 1 are exemplary in nature and in number and should not be construed as limiting.

Accordingly, any number of components may be employed to achieve the desired functionality within the scope of embodiments of the present invention. Although the various components of FIG. 1 are shown with lines for the sake of clarity, in reality, delineating various components is not so clear, and metaphorically, the lines would more accurately be grey or fuzzy. Further, although some components of FIG. 1 are depicted as single blocks, the depictions are exemplary in nature and in number and are not to be construed as limiting (e.g., although only one mobile device 110 and one recipient device 150 is shown, many more may be communicatively coupled to the wireless network 140).

Further, the components of the exemplary system architecture may be interconnected by any method known in the relevant field. For instance, the recipient device 150 and the wireless network 140 may be operably coupled via a distributed communications environment that includes multiple BTSs coupled with one another via one or more networks. In embodiments, the wireless network 140 may include, without limitation, one or more local area networks (LANs) and/or wide area networks (WANs). Such networking environments are commonplace in offices, enterprise-wide computer networks, intranets, and the Internet. In addition, many more components (e.g., BTSs, devices, and the like) may be operably coupled to wireless network 140.

In yet other embodiments, the wireless network 140 may couple components 110, 120, 130, and 150, thereby forming a distributed computing environment where tasks are performed by remote-processing devices that are linked through appropriate connections. These connections may be established by wired technologies, wireless technologies, or a combination thereof. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.) that are different from the specific illustrated embodiments. Therefore it is emphasized that embodiments of the connections between components are not limited by the examples described, but embrace a wide variety of methods of communications.

Figure 2:
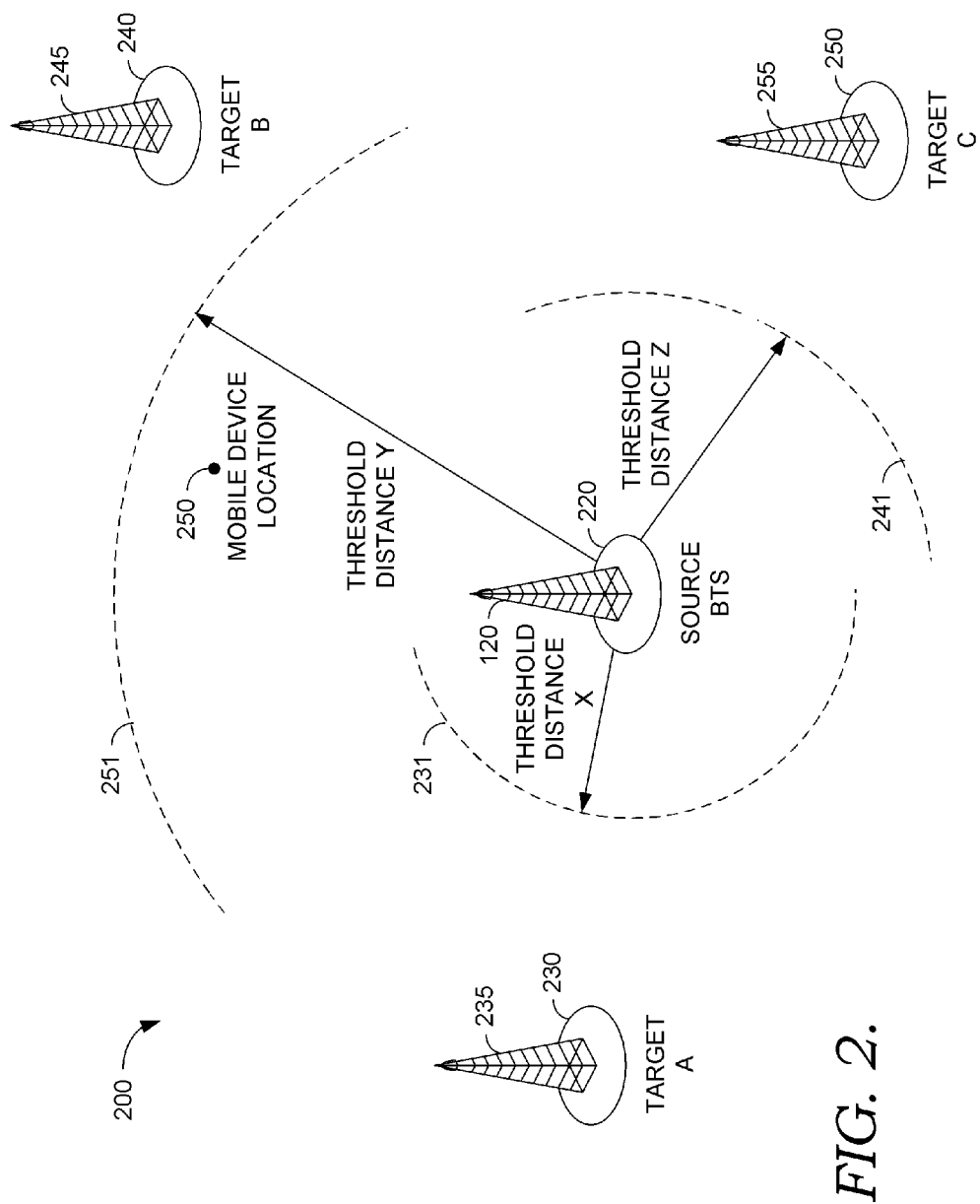
FIG. 2 is a block diagram of an exemplary wireless network environment that depicts dispersed BTSs for promoting communication of a mobile device through a wireless network, in accordance with an embodiment of the present invention.

Referring now to FIG. 2, a block diagram of an exemplary wireless network environment 200 is illustrated that shows dispersed BTSs 120, 235, 245, and 255 for promoting communication of a mobile device (e.g., utilizing the mobile device 110 of FIG. 1) through a wireless network, in accordance with an embodiment of the present invention. Initially a threshold distance is established between a site 220 of the source BTS 120 and a site of each of the BTSs considered as being candidate BTSs. In the embodiment illustrated, the candidate BTSs comprise target A 235, target B 245, and target C 255 that each are located at a site 230, 240, and 250, respectively. As shown, the threshold distances comprise threshold distance X 231, threshold distance Y 241, and threshold distance Z 251. In an exemplary embodiment, the table maintained at the source BTS 120 associates the threshold distance X 231 with the target A 235, threshold distance Y 241 with the target B 245, and threshold distance Z 251 with the target C 255. In an exemplary embodiment, the threshold distances X 231, Y 241, and Z 251 are determined based on an optimal location where the coverage areas of the source BTS 120 and a respective candidate BTS overlap.

Figure 4:
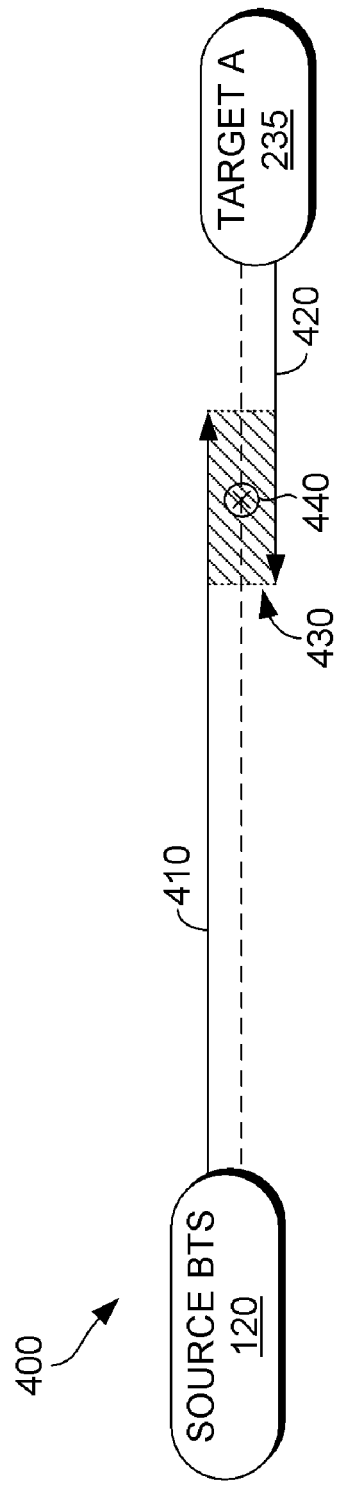
FIG. 4 is a graphical depiction illustrating a method for selecting a threshold distance from the source BTS by identifying a location that optimizes a roundtrip delay (RTD) of a communication between the mobile device, the source BTS, and the target BTS, in accordance with an embodiment of the present invention.

This determination of the threshold distance will now be described more fully with reference to FIG. 4. The embodiment depicted in FIG. 4 shows a graphical depiction illustrating a method for selecting a threshold distance to a candidate BTS (target A 235) from the source BTS 120 by identifying a location that falls within an overlap of their respective coverage areas. Initially, a region 430 is identified where the coverage areas overlap. The coverage areas are determined by a distance a signal carries from each of the source BTS 120 and the target A 235, as well as a strength of the signals, clarity of the signals, or any other factor pertinent to maintaining/transferring a connection of the mobile device.

Reference numeral 410 represents a scope of the coverage area generated by the source BTS 120, while reference numeral 420 represents a scope of the coverage area generated by the target A 235. As depicted, the scope 410 of the coverage area generated by the source BTS 120 is greater than the scope 420 of the coverage area generated by the target A 235. Accordingly, the resultant threshold distance from the source BTS 120 that is associated with the target A 235 is likely farther than the resultant threshold distance from the target A 235 that is associated with the source BTS 120, when the target A 235 is connected to the mobile device.

As discussed above, the overlap of these coverage areas is indicated by the region 430. Within the region 430 a optimal location 440 is established. This optimal location 440 may be based on any number of factors that influence a connection of a mobile device to a BTS. In one instance, the optimal location 440 is a location in the region 430 that optimizes a roundtrip delay (RTD) of a communication between both the mobile device and the source BTS 120, and the mobile device and the target BTS. Accordingly, the optimal location 440 is utilized to set the threshold distance (e.g., threshold distance X 231 of FIG. 2) associated with the target A 235 from the source BTS 120.

Figure 3:
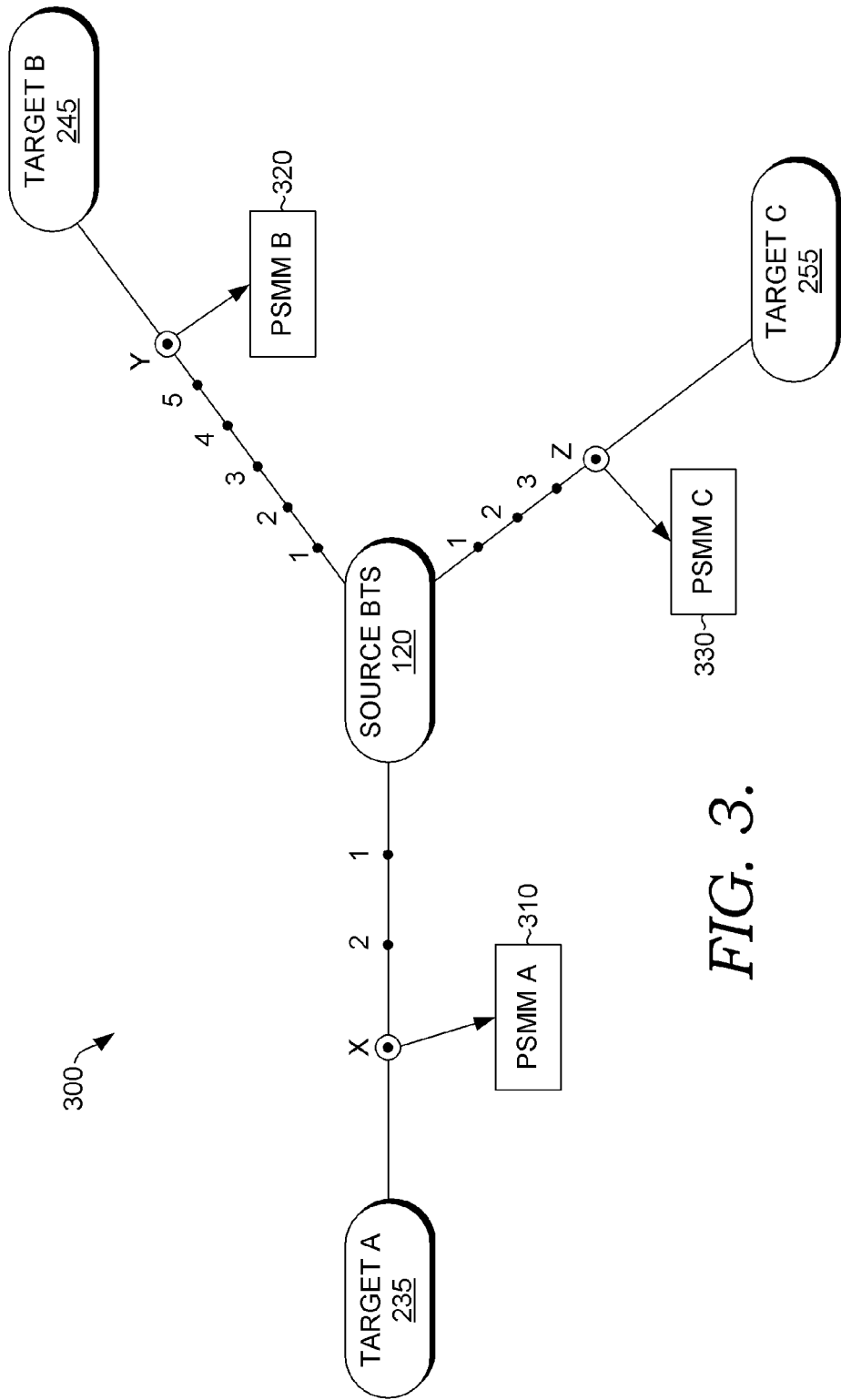
FIG. 3 is a graphical depiction illustrating a utilization of pilot strength measurement message (PSMM) from a source BTS to ascertain whether to invoke a handoff of the mobile device to a target BTS, in accordance with an embodiment of the present invention.

In embodiments, the association between the threshold distance and a candidate device is made by capturing a snapshot of a boundary PSMM that is communicated from a threshold distance. In embodiments, with reference to FIG. 4, this snapshot PSMM is taken at the optimal location 440. This PSMM snapshot is typically stored in a location accessible to the source BTS 120, such as the above-described table at the data store. As depicted in FIGS. 3 and 6, a PSMM snapshot may be captured at a threshold distance (e.g., X, Y, and/or Z) and stored in a table in association with that distance. A discussion of the PSMM snapshot will follow, infra, with reference to FIGS. 3 and 6. In particular, FIG. 3, shows a graphical depiction illustrating capturing a PSMM to ascertain whether to invoke a handoff of the mobile device, while FIG. 6 shows an illustrative table 600 that arranges exemplary criteria for initiating a handoff, in accordance with an embodiment of the present invention.

Initially, PSMM's are captured for each of the identified threshold distances. For instance, PSMM A 310 is captured at the threshold distance X associated with target A 235, PSMM B 320 is captured at the threshold distance Y associated with target B 245, and PSMM C 330 is captured at the threshold distance Z associated with target C 255. As discussed above, each of the threshold distances X, Y, and Z may be a different distance from the source BTS 120 based, in part, on the optimal locations for establishing connections to the respective candidate BTSs. This is illustrated at FIG. 3, where PSMM B 320 is captured at a threshold distance Y that is more removed from the source BTS 120 than the threshold distance X at which PSMM A 310 is captured. The variation in threshold distances, as more fully discussed above, may be explained by a location of candidate BTSs with respect to the source BTS 120, signal strengths of the BTSs, or any other factor that influences connectivity between a mobile device and a BTS.

Turning to FIG. 6, the captured PSMM's 620 are stored in association with the threshold distances 610. Although not illustrated, the captured PSMM's 620 and the threshold distances 610 may be stored in association with, or mapped to, a candidate BTS. This mapping is reflected in the exemplary actions 630 that are invoked upon detecting a movement of position of the mobile device. For instance, if a position of the mobile device is detected to traverse threshold distance X 611, a PSMM reported from the mobile device is compared against the captured PSMM A 621. If the reported PSMM and the captured PSMM A 621 correspond, the exemplary action 631 is taken. The exemplary action 631 may include initiating a handoff of the mobile device from the source BTS 120 (see FIG. 3) to the candidate BTS labeled target A 235 (see FIG. 3). If the reported PSMM and the captured PSMM A do not correspond, the no exemplary action is taken. Or, an action may taken, which may include maintaining the connection between the mobile device and the source BTS 120 (see FIG. 3) and abstaining from initiating a handoff.

As mentioned above, a PSMM may be reported by the mobile device. In an exemplary embodiment, the reported PSMM represents information provided to the mobile device in a PSMM previously sent to the mobile device from the source BTS 120. Turning to FIG. 5, an illustrative display showing an exemplary PSMM 500 reported from a mobile device is provided, in accordance with an embodiment of the present invention. Initially, the exemplary PSMM 500 includes elements that may reveal information related to the mobile device, such as a message identifier 510, a time of transmission 520, a location of the mobile device 530, and a manifest of pilot signal strengths 540.

The location of the mobile device 530 may be expressed in global coordinates, or any other positioning convention known in the relevant field. Further, the location of the mobile device 530 allows the source BTS to identify a distance and radial direction of the mobile device with respect thereto. Accordingly, the location of the mobile device 530 allows the source BTS to recognize which candidate BTSs are proximate to the current position of the mobile device so that they may be targeted for a potential handoff.

The manifest of pilot signal strengths 540 allows the source BTS to recognize a quality of connectivity between the mobile device and BTSs including the source BTS, candidate BTSs, and/or other neighboring BTSs within the wireless network in the vicinity of the mobile device. As such, the pilot signal strengths 540, along with other elements of the exemplary PSMM 500, allow for comparison with the captured PSMM and determination of whether to initiate a handoff. Although one configuration of the exemplary PSMM 500 has been described, it should be understood and appreciated by those of ordinary skill in the art that other types of suitable messages that provide the source BTS with a basis of comparison may be used, and that embodiments of the present invention are not limited to those elements of the exemplary PSMM 500 described herein. For instance, GPS coordinates may be captured and stored, and compared against a message from the mobile device that has GPS coordinates of its location. Further, in this instance described above, the captured GPS coordinates may be mapped to one or more target BTSs of the candidate BTSs to identify a BTS for receiving the potential handoff.

Figure 7:
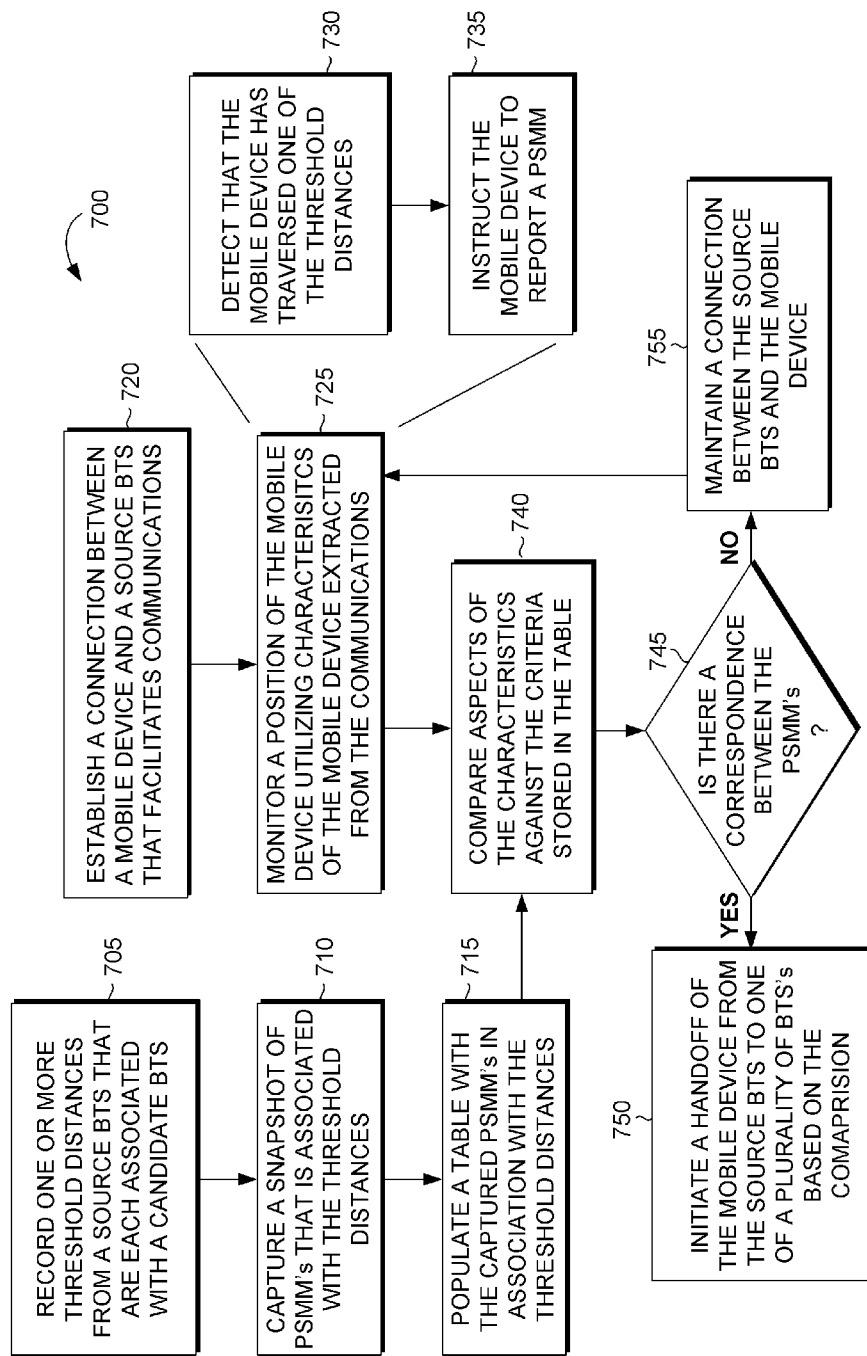
FIG. 7 is a flow diagram showing an overall method for initiating a handoff from a source BTS to one of a plurality of candidate BTSs of a wireless network, in accordance with an embodiment of the present invention.

The operation of the system 100 of FIG. 1 will now be described with reference to FIG. 7. In particular, in FIG. 7, a flow diagram showing an overall method 700 for initiating a handoff from a source BTS to one of a plurality of candidate BTSs of a wireless network, in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described. Initially, one or more threshold distances (e.g., threshold distances X, Y, and Z of FIG. 2) from a source BTS are recorded, as indicated a block 705. Each of these distances is typically associated with a candidate BTS (e.g., target A 230, target B 240, and target C 250 of FIG. 2). Further, in embodiments, each of the distances may be ascertained by optimizing an RTD of a communication between the mobile device, the source BTS, and/or at least one candidate BTS. Snapshots of PSMM's (e.g., PSMM A 310, PSMM B 320, and PSMM C 330 of FIG. 3) that are associated with the threshold distances are captured, as indicated at block 710. As indicated at block 715, a table (e.g., table 600 of FIG. 6), or any other format used for structured storage, is populated with the captured PSMM's, the threshold distances, and any other criteria collected to assist in ascertaining whether to invoke a handoff.

In operation, the exemplary wireless network environment 200 of FIG. 2 facilitates triggering a handoff based on a position of the mobile device 250 (see FIG. 2). Initially, a connection is established between the mobile device and a source BTS, as indicated at block 720. Generally, the connection facilitates communications, such as call and data sessions, between the mobile device and a wireless network. The position of the mobile device may be monitored by any manner, as indicated at block 725. In embodiments, monitoring may include extracting characteristics of the mobile device from communications conveyed therefrom. In particular, the process of monitoring may include detecting that the mobile device has traversed one of the recorded threshold distances (see block 730) and instructing the mobile device to report a PSMM (see block 735). As discussed above, the detection that the mobile device has traversed one of the threshold distances may be accomplished by evaluating an RTD of a communication between the mobile device and the source BTS.

As indicated at block 740, aspects of the characteristics of the mobile device, such as information reported in a PSMM, are compared against the criteria of the table, such as the captured PSMM's associated with the threshold distance that has been traversed. A determination of whether there is correspondence between the PSMM's is conducted, as indicated at block 745. If the determination yields a positive result, wherein correspondence exists between the PSMM's, a handoff is initiated of the mobile device from the source BTS to one of the candidate BTS, as indicated at block 750. In embodiments, a target BTS is selected from the candidate BTSs for receiving the handoff based upon the comparison. In one instance, the selection based on the comparison is based upon which candidate BTS is mapped to the captured PSMM that is stored in the table. In another instance, the selection based on the comparison is based upon properties of the information stored within the corresponding captured PSMM.

If the determination yields a negative result, wherein no correspondence exists between the PSMM's, the connection between the mobile device and the source BTS is maintained, as indicated at block 755. In embodiments, the procedure of monitoring the position of the mobile device, as indicated at block 725, is resumed. That is, the position of the mobile device is again tracked to determine whether a subscriber of the wireless network carries the mobile device across another of the threshold distances. Upon receiving a notice that another threshold distance is traversed, the process repeats such that the device is instructed to report a current PSMM for comparison. Accordingly, the system of the present invention is capable of reevaluating whether the connection of the mobile device to the source BTS is to be handed off to a candidate BTS upon crossing each of the threshold distances.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transient computer-readable media having computer-useable instructions embodied thereon for performing a method of triggering a handoff between a plurality of base transceiver stations (BTSs) of a wireless network, wherein the method comprises:
   receiving a first communication at a source BTS transmitted from a mobile device via a connection between the mobile device and the source BTS;
   recognizing a pilot strength measurement message (PSMM) carried by the first communication;
   reading characteristics of the mobile device from the PSMM, wherein the mobile-device characteristics include a distance and radial direction of the mobile device with respect to the source BTS;
   accessing a table of predefined criteria associated with candidate BTSs that have respective coverage areas overlapping a coverage area of the source BTS, wherein the predefined criteria include threshold distances that trigger handing off to the candidate BTSs, respectively, wherein the table stored in association with the source BTS;
   determining whether to invoke a handoff of the mobile device from the source BTS to a target BTS by comparing the mobile-device characteristics against the predefined criteria of the accessed table, wherein determining comprises:
   (a) selecting a target BTS from the candidate BTSs using the radial direction of the mobile device; and
   (b) comparing the distance of the mobile device against a threshold distance associated with the target BTS;
   when it is determined that a handoff is to be invoked, triggering the target BTS to initiate establishing a connection with the mobile device; and
   otherwise maintaining the connection between the mobile device at the source BTS.

2. The computer-readable media of claim 1, further comprising:
   tearing down the connection between the mobile device and the source BTS; and
   receiving a second communication at the target BTS via the established connection.

3. The computer-readable media of claim 1, wherein receiving a first communication at the source BTS via the connection comprises carrying the first communication on a channel of a wireless network supported by the source BTS.

4. The computer-readable media of claim 3, wherein receiving a second communication at the target BTS via the established connection comprises carrying the second communication on a new channel of a wireless network supported by the source BTS.

5. The computer-readable media of claim 1, wherein the threshold distance from the source BTS exists at a location at which the coverage area of the source BTS and a coverage area of the target BTS overlap.

6. The computer-readable media of claim 5, wherein the threshold distance from the source BTS is selected by identifying the location that optimizes both a roundtrip delay (RTD) of a communication between the mobile device and the source BTS, and an RTD between the mobile device and the target BTS.

7. The computer-readable media of claim 6, wherein determining whether to invoke a handoff of the mobile device from the source BTS to a target BTS further comprises capturing, at least temporarily, a snapshot of a boundary PSMM communicated from the threshold distance of the target BTS.

8. The computer-readable media of claim 7, wherein determining whether to invoke a handoff of the mobile device from the source BTS to a target BTS further comprises monitoring a position of the mobile device, wherein the position of the mobile device is identified utilizing the RTD of a communication between the mobile device and the source BTS.

9. The computer-readable media of claim 8, wherein determining whether to invoke a handoff of the mobile device from the source BTS to a target BTS further comprises:
   comparing the PSMM carried by the first communication transmitted by the mobile device against the captured snapshot of the boundary PSMM; and
   when the comparison indicates that the PSMM and the boundary PSMM correspond, invoking the handoff of the mobile device from the source BTS to the target BTS.

10. A computerized method for initiating a handoff from a source base transceiver station (BTS) to one of a plurality of candidate BTSs of a wireless network, wherein the method comprises:
   establishing a connection between a mobile device and the source BTS that facilitates the conveyance of communications therebetween;
   monitoring a position of the mobile device utilizing characteristics of the mobile device extracted from the communications, wherein the characteristics include a distance and radial direction of the mobile device in relation to the source BTS;

accessing a table of predefined criteria associated with the plurality of candidate BTSs, wherein the predefined criteria include threshold distances that trigger handing off to the plurality of candidate BTSs, respectively, wherein the table stored in association with the source BTS;

comparing aspects of the characteristics against the predefined criteria of the table, wherein comparing comprises:
(a) selecting a target BTS from the plurality of candidate BTSs using the radial direction of the mobile device; and
(b) comparing the distance of the mobile device against a threshold distance associated with the target BTS; initiating a handoff of the mobile device from the source BTS to the target BTS as a function of an outcome of the comparison.

11. The computerized method of claim 10, wherein the plurality of candidate BTSs are neighbors of the source BTS such that a coverage area of each of the plurality of candidate BTSs overlaps a coverage area of the source BTS.

12. The computerized method of claim 10, further comprising:
recording a plurality of threshold distances from the source BTS that are each associated with one of the plurality of candidate BTSs; and
at least temporarily, saving to the recorded threshold distances to the table, wherein each of the threshold distances is associated with a respective one of the plurality of candidate BTSs.

13. The computerized method of claim 12, wherein the plurality of threshold distances are extrapolated by optimizing a round-trip delay (RTD) of a communication between the mobile device and the source BTS, and an RTD between the mobile device and each of the plurality of candidate BTSs.

14. The computerized method of claim 13, further comprising:
capturing PSMM's that are each associated with each of the plurality of threshold distances; and
populating the captured PSMM's on the table consistent with the associated one of the plurality of threshold distances.

15. The computerized method of claim 14, wherein monitoring a position of the mobile device utilizing characteristics of the mobile device extracted from the communications comprises:
detecting that the position of the mobile device has traversed one of the plurality of threshold distances by evaluating the RTD of a communication between the mobile device and the source BTS; and
instructing the mobile device to report a latest PSMM received from the BTS source.

16. The computerized method of claim 15, wherein comparing aspects of the characteristics against a table of predefined criteria stored in association with the source BTS comprises:
ascertaining the reported PSMM matches at least one of the captured PSMM's populating on the table; and
based on properties of the matching captured PSMM, selecting one of the plurality of candidate BTSs for initiating establishing a connection with the mobile device.

17. The computerized method of claim 16, wherein the predefined criteria utilized for ascertaining whether to initiate a handoff comprises the captured PSMM's and the plurality of threshold distances populated to the table.

18. A computer system capable of initiating a handoff from a first base transceiver station (BTS) to one of a plurality of candidate BTSs that support a wireless network, the computer system comprising:
a mobile device that is configured to transmit communications via a wireless connection with the first BTS;
the first BTS for monitoring a position of the mobile device utilizing characteristics of the mobile device extracted from the communications, wherein the characteristics include a distance and radial direction of the mobile device in relation to the source BTS, and for comparing aspects of the characteristics against a table of predefined criteria stored in association with the source BTS, wherein the table includes predefined criteria associated with the plurality of candidate BTSs, wherein the predefined criteria include threshold distances that trigger handing off to the candidate BTSs, respectively, wherein comparing comprises:
(a) selecting a second BTS from the candidate BTSs using the radial direction of the mobile device; and
(b) comparing the distance of the mobile device against a threshold distance associated with the second BTS;
the plurality of candidate BTSs that represent neighbors of the first BTS such that a coverage area of each of the plurality of candidate BTSs overlaps a coverage area of the source BTS; and
the second BTS for initiating a handoff of the mobile device from the first BTS thereto as a function of the outcome of the comparison.

* * * * *